United States Patent
Ueda et al.

(10) Patent No.: US 6,712,520 B2
(45) Date of Patent: Mar. 30, 2004

(54) CAGE FOR ROLLER BEARING

(75) Inventors: Koji Ueda, Fujisawa (JP); Keijiro Yamaguchi, Yokohama (JP); Shinichi Tsunashima, Fujisawa (JP); Takashi Murai, Koza-gun (JP); Osamu Fujii, Yokohama (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/890,958

(22) PCT Filed: Feb. 26, 2001

(86) PCT No.: PCT/JP01/00535
§ 371 (c)(1),
(2), (4) Date: Aug. 8, 2001

(87) PCT Pub. No.: WO01/55608
PCT Pub. Date: Aug. 2, 2001

(65) Prior Publication Data
US 2003/0021505 A1 Jan. 30, 2003

(30) Foreign Application Priority Data
Jan. 28, 2000 (JP) .......................... 2000-20568

(51) Int. Cl.[7] .......................... F16C 33/38; F16C 33/44
(52) U.S. Cl. .................. 384/523; 384/527; 384/492; 384/621
(58) Field of Search ................ 384/523, 527, 384/528, 492, 621, 623, 625

(56) References Cited

U.S. PATENT DOCUMENTS

| | | | | |
|---|---|---|---|---|
| 4,385,788 A | * | 5/1983 | Brown et al. | 384/467 |
| 4,830,686 A | * | 5/1989 | Hashiguchi et al. | 148/320 |
| 5,075,177 A | * | 12/1991 | Tanaka et al. | 228/235.2 |
| 5,642,988 A | * | 7/1997 | Zorn | 417/273 |
| 5,833,373 A | * | 11/1998 | Ueno et al. | 384/527 |
| 5,895,516 A | * | 4/1999 | Tanaka et al. | 384/912 |
| 6,010,248 A | | 1/2000 | Ueno et al. | 384/527 |
| 6,051,082 A | * | 4/2000 | Okita et al. | 148/333 |
| 6,056,833 A | * | 5/2000 | Asfahani et al. | 148/334 |
| 6,070,671 A | * | 6/2000 | Cumming et al. | 166/206 |
| 6,101,719 A | * | 8/2000 | Kiuchi et al. | 29/898.13 |
| 6,159,348 A | * | 12/2000 | Barnsby et al. | 204/192.15 |
| 6,178,306 B1 | * | 1/2001 | Mizoguchi et al. | 148/518 |
| 6,358,333 B1 | * | 3/2002 | Tanaka et al. | 148/318 |

FOREIGN PATENT DOCUMENTS

| | | | |
|---|---|---|---|
| EP | 802339 | | 10/1997 |
| JP | 649623 | | 2/1994 |
| JP | 11051059 | | 2/1999 |
| JP | 11303874 A | * | 11/1999 |
| JP | 2000205274 | | 7/2000 |
| WO | WO-9906670 A1 | * | 2/1999 |

* cited by examiner

Primary Examiner—Jack Lavinder
Assistant Examiner—Melody M. Burch
(74) Attorney, Agent, or Firm—Crowell & Moring LLP

(57) ABSTRACT

A cage is made of a low carbon steel and is for use in a rolling bearing which includes an outer ring, an inner ring and a plurality of rolling elements disposed rotationally between the outer ring and the inner ring. The cage includes a plurality of pockets for retaining the rolling elements in an equi-distribution in the rotating direction of the rolling elements. The low carbon steel is a steel containing from 0.02 to 0.10% by weight of C and from 0.10 to 0.45% by weight of Mn and is subjected to plastic working. The hardness for the pocket surface at least at a portion in contact with the rolling element is Hv 190 to 270, and the hardness for the core portion in the cage section is Hv 110 to 170.

4 Claims, 3 Drawing Sheets

CAGE FOR ROLLER BEARING

TECHNICAL FIELD

The present invention relates to a cage for use in a rolling bearing and, more in particular, it relates to a cage for use in a rolling bearing used, for example, in general industrial machines, machine tools and machines for iron and steel making.

BACKGROUND ART

Heretofore, soft steel and high strength brass have been used as metal materials for cages for use in rolling bearings. The high strength brass has self lubricity but since it requires high material cost, needs high working cost since fabricated by machining and provides low material yield, it is restricted to special application uses. With the reasons described above, SPCC materials have mostly been used as the metal material for the cage for use in rolling bearings, and cages for use in rolling bearings have been manufactured from steel plates by press molding while taking advantage of their molding workability.

SPCC materials have high general purpose applicability and is manufactured into various parts by press molding and the compositional range thereof specified according to JIS standards is extensively wide as C content of 0.12% or less and Mn content of 0.5% or less.

Cages for use in the rolling bearing manufactured by press molding from deep drawn steel plates as the SPCC materials with extremely reduced C content of as low as the order of 0.001% have low yield strength because of extremely low C content, so that the cage for use in the rolling bearing may possibly lack in the strength. That is, since the levels for the strength of the SPCC materials differ even when the composition is within the range of JIS standards, the strength of the cage varies sometimes failing to obtain stable performance.

Further, even for an identical composition, since the hardness changes depending on the difference of the state of annealing, the hardness, that is, the strength may possibly vary greatly to result in a problem that a stable performance as the cage for use in the rolling bearing can not be obtained easily.

On the other hand, working conditions for rolling bearing have become more stringent in recent years and high load capacity rolling bearings have been developed in recent years. For coping with the high load capacity, a method of decreasing the diameter of a roller to increase the number of the rollers has been adopted or the shape of the cage for use in the rolling bearing has been optimally designed, which makes the shape complicated.

Particularly, in the case of the method of increasing the number of rollers by increasing the load capacity, since the space between the rollers is decreased, it is necessary to make the bar of the cage for use in the rolling bearing finer. Accordingly, depending on the composition and the hardness of the SPCC material used, it may be a worry that the strength of the bar of the cage for use in the rolling bearing becomes insufficient to cause deformation, or plastic deformation is caused at the surface of contact with a rolling element of a rolling bearing, so that the shape and the dimensional accuracy of the cage for use in the bearing can no more be maintained to possibly cause fracture in the worst case.

In view of the above, it is a subject of the present invention to overcome the problems in the existent cages for use in a rolling bearing as described above and provide a high strength cage for use in a rolling bearing less causing deformation or fracture and having stable performance.

DISCLOSURE OF THE INVENTION

For solving the foregoing subject, the present invention comprises the following constitution. That is, a cage for use in a rolling hearing in accordance with the present invention provides a cage made of a low carbon steel used in a rolling bearing, comprising an outer ring, an inner ring, a plurality of rolling elements disposed rotationally between the outer ring and the inner ring and having pockets for retaining the rolling elements in an equi-distribution in the rotating direction of the rolling elements, wherein the hardness for the surface at least at a portion of contact with the rolling element is Hv 190 or more and the hardness at the inside or core portion of the cage is Hv 110 to 170.

With such a constitution, the cage for use in the rolling bearing can be kept at a high strength and deformation or fracture at a portion of contact with the rolling element of the rolling bearing that generates impact load can be suppressed.

When the hardness for the surface of the cage for use in the rolling bearing at least for a portion of contact with the rolling element is less than Hv 190, plastic deformation tends to be caused by impact load by the contact with the rolling element of the rolling bearing tending to cause deformation or fracture to the cage.

For suppressing the disadvantage described above, the hardness for the surface of the cage for use in the rolling bearing at least for a portion of contact with the rolling element is preferably Hv 200 or more.

Further, if the hardness for the inside of the cage for use in the rolling bearing is less than Hv 110, the cage tends to cause deformation or fracture and, on the other hand, when it exceeds Hv 170, although the strength of the cage is improved, the moldability is lowered to cause difficulty in obtaining a predetermined dimensional accuracy.

For further suppressing the deformation or fracture, the hardness for the inside of the case for use in the rolling bearing is preferably Hv 120 to 170. Further, considering the moldability upon press molding or the like, Hv 110 to 160 is preferred.

Further, the ratio between the yield strength and the tensile strength (yield strength/tensile strength) of the low carbon steel is preferably from 0.65 to 0.75. When the ratio between the yield strength and the tensile strength of the low carbon steel is less than 0.65, the cage lacks in the strength and it is difficult to obtain a predetermined dimensional accuracy. For suppressing such a disadvantage, the ratio between the yield strength and the tensile strength of the low carbon steel is more preferably 0.70 or more. A higher ratio for the yield strength and the tensile strength of the low carbon steel is desirable but 0.75 is a limit value (upper limit) with a commercial point of view (refer to FIG. 1).

Further, the low carbon steel may be a steel containing from 0.02 to 0.10% by weight of C and from 0.10 to 0.45% by weight of Mn.

C has an effect of solid solubilized in the matrix ferrite to remarkably increase the strength and, since this effect is fully attained by 0.02% by weight or more, the C content is preferably 0.02% by weight or more. However, when it is contained in excess of 0.10% by weight, the effect is no more improved but saturated. Further, the ductility is lowered to deteriorate the moldability and it is difficult to ensure the dimensional accuracy of the cage for use in the rolling bearing after pressing in the case of press molding, so that the C content is preferably 0.10% by weight or less. Accordingly, the C content is preferably from 0.02 to 0.10% by weight.

Further, Mn has an effect of solid solubilized in the matrix ferrite to strengthen the material and, since this effect is fully attained by 0.10% by weight or more, the Mn content is preferably 0.10% by weight or more. On the other hand, when Mn is added in excess, the moldability is deteriorated and cracking tends to occur during molding in the case of the press molding, so that it is preferably 0.45% by weight or less. Accordingly, the Mn content is preferably from 0.10 to 0.45% by weight.

BEST MODE FOR PRACTICING THE INVENTION

A mode of practicing a cage for use in a rolling bearing according to the present invention is to be described specifically with reference to the drawings.

At first, the metal material of the cage for use in the rolling bearing in this embodiment is to be described.

In order to prevent fracture of the cage for use in the rolling bearing during use, it is necessary to use a steel material of high tensile strength as the material and it is also necessary to use a steel material of high yield stress in order to stably keep the dimensional accuracy of the cage for use in the rolling bearing. Accordingly, the strength of the cage for use in the rolling bearing can be evaluated by the ratio between the yield strength and the tensile strength of the steel material (hereinafter referred to as yield strength/ tensile strength).

Figure 1:
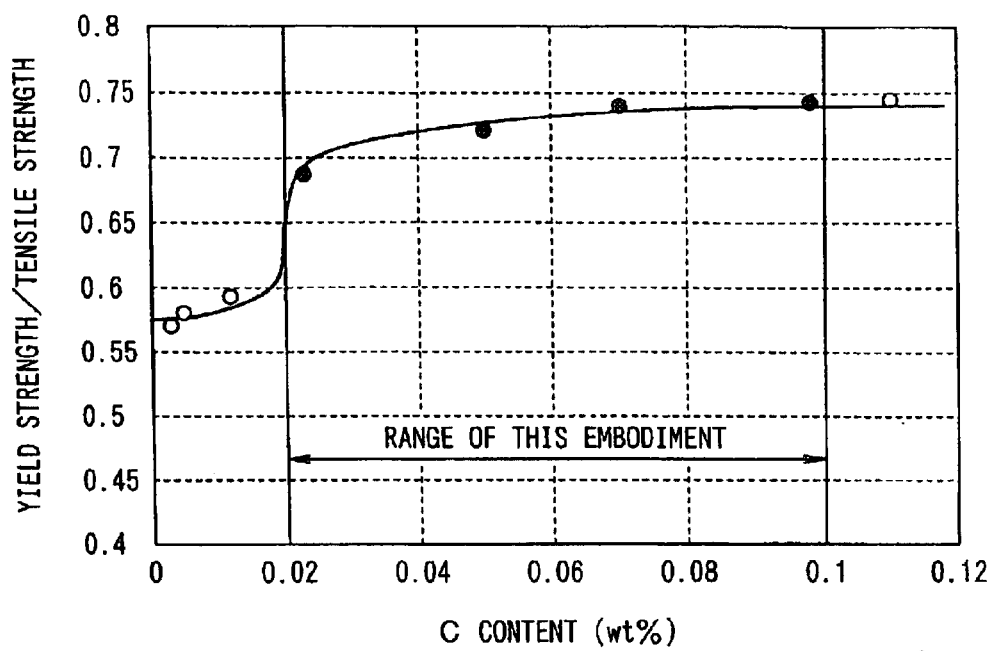
FIG. 1 is a graph showing a relation between the C content and the strength ratio (yield strength/tensile strength) in steels.

Then, a tensile test was conducted on eight kinds of SPCC materials of the compositions shown in Table 1 and the relation between the C content and the yield strength/tensile strength was evaluated. The result is shown in the graph of FIG. 1. Standard refined material was used for each of the SPP materials (plate materials).

TABLE 1

| C | Si | Mn | S | P |
|---|---|---|---|---|
| 0.003 | <0.01 | 0.1 | 0.006 | 0.011 |
| 0.005 | <0.01 | 0.13 | 0.008 | 0.012 |
| 0.012 | <0.01 | 0.14 | 0.006 | 0.009 |
| 0.023 | <0.01 | 0.18 | 0.009 | 0.011 |
| 0.050 | <0.01 | 0.18 | 0.006 | 0.010 |
| 0.070 | <0.01 | 0.25 | 0.007 | 0.011 |
| 0.098 | <0.01 | 0.37 | 0.006 | 0.013 |
| 0.112 | <0.01 | 0.31 | 0.004 | 0.011 |

As can be seen from FIG. 1, when the C content is less than 0.02% by weight, the value for the yield strength/tensile strength is small since the solid solubilized amount of carbon in ferrite is small, but when it is added by 0.02% by weight or more, the value for the yield strength/tensile strength is remarkably improved by solid solution strengthening of C. However, if it exceeds 0.10% by weight, the value for the yield strength/tensile strength is substantially saturated.

From the result described above, it can be seen that the C content is preferably from 0.02 to 0.10% by weight as the metal material for the cage for use in the rolling bearing. Then, such a metal material has a high yield/tensile strength value and can prevent fracture of the cage for use in the rolling bearing during use and stably keep the dimensional accuracy of the cage for use in the rolling bearing. As can be seen from FIG. 1, the yielded strength/tensile strength value of the metal material is from 0.65 to 0.75 and, more preferably, from 0.70 to 0.75.

Figure 2:
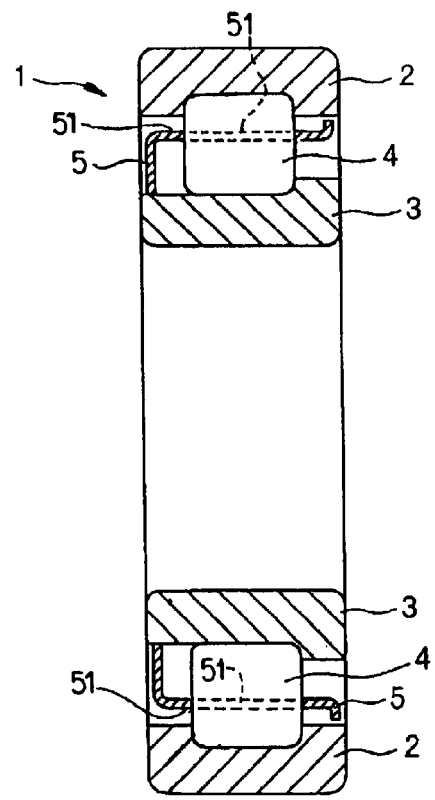
FIG. 2 is a cross sectional view of a cylindrical roller bearing having a cage for use in a rolling bearing of this embodiment.

Then, the cage for use in the rolling bearing according to this embodiment is to be described. FIG. 2 is a Cross sectional view of a cylindrical roller hearing having a cage for use in the wiling bearing as one embodiment according to the present invention. A cylindrical roller bearing 1 (hearing number NJ 308 manufactured by NSK Ltd.) comprises an outer ring 2, an inner ring 2, a plurality of rollers disposed rotationally between the outer ring 2 and the inner ring 3 and a pressed cage 5 made of a cold rolled steel plate for retaining the plurality of rollers 4. The pressed cage 5 is a window type cage manufactured from SPCC materials containing C and Ma of composition shown in Table 2.

TABLE 2

| | Compositions of SCCP Material | | | | | |
|---|---|---|---|---|---|---|
| | C content (wt %) | Mn content (wt %) | Hardness at surface[1] Hv | Hardness at inside Hv | Fracture load[2] (kN) | Number of repetitive rotation[3] (× $10^7$ cycle) |
| Example 1 | 0.021 | 0.1 | 195 | 112 | 4.90 | 2.5 |
| Example 2 | 0.041 | 0.11 | 198 | 115 | 4.86 | 3.3 |

TABLE 2-continued

Compositions of SCCP Material

| | C content (wt %) | Mn content (wt %) | Hardness at surface[1] Hv | Hardness at inside Hv | Fracture load[2] (kN) | Number of repetitive rotation[3] ($\times 10^7$ cycle) |
|---|---|---|---|---|---|---|
| Example 3 | 0.032 | 0.18 | 204 | 120 | 4.86 | 4.8 |
| Example 4 | 0.055 | 0.21 | 210 | 123 | 4.89 | 5.0 |
| Example 5 | 0.055 | 0.21 | 241 | 158 | 5.04 | 5.8 |
| Example 6 | 0.090 | 0.35 | 216 | 133 | 4.96 | 5.3 |
| Example 7 | 0.040 | 0.44 | 222 | 139 | 4.98 | 6.3 |
| Example 8 | 0.100 | 0.45 | 263 | 166 | 5.02 | 7.5 |
| Comp. Example 1 | 0.112 | 0.48 | 259 | 175 | poor accuracy[4] | poor accuracy[4] |
| Comp. Example 2 | 0.055 | 0.21 | 278 | 173 | poor accuracy[4] | poor accuracy[4] |
| Comp. Example 3 | 0.055 | 0.21 | 186 | 106 | 3.95 | 0.78 |
| Comp. Example 4 | 0.005 | 0.09 | 185 | 98 | 3.88 | 0.42 |
| Comp. Example 5 | 0.032 | 0.18 | 179 | 122 | 4.49 | 0.53 |
| Comp. Example 6 | 0.004 | 0.11 | 198 | 95 | 3.97 | 0.44 |
| Comp. Example 7 | 0.006 | 0.13 | 208 | 105 | 3.99 | 0.58 |

[1]A portion of surface in contact with rolling element
[2]Load at which the cage for use in rolling bearing is fractured by tensile test
[3]Number of repetitive rotation till fracture of the cage for use in the rolling bearing by the rotation durability test
[4]poor dimensional accuracy of cage for use in rolling bearing A rotation durability test and a tensile test were conducted on pressed cages 5 and the performance was confirmed.

The rotation durability test was conducted under the condition of switching forward rotation and backward rotation on every unit time and an accelerated evaluation was conducted. The test conditions are shown below.

| Rotation switching rate | 10 Hz or more |
|---|---|
| Lubrication condition | Oil Bath Lubrication |
| Lubricat | Mobile (ISO VG 68) |

Figure 3A:
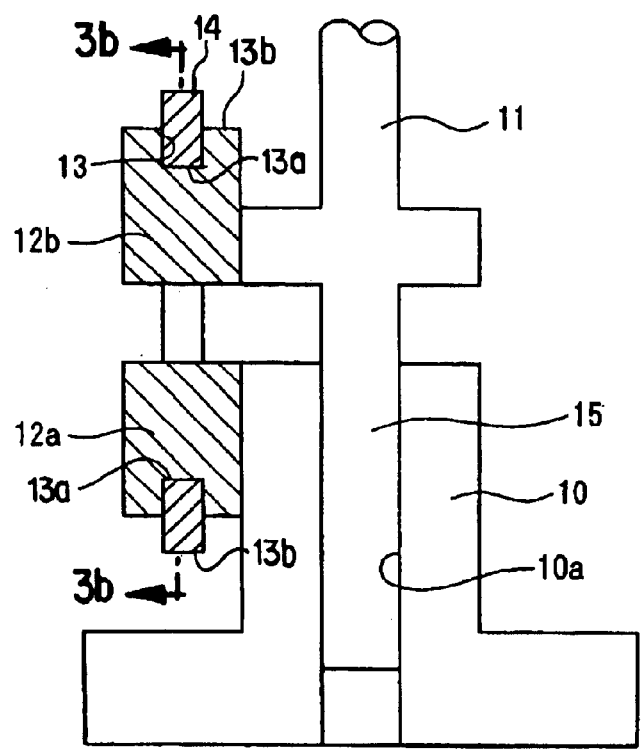
FIG. 3(a) is a view describing the method of a tensile test for the cage.

Then, a method of a tensile test by using a ring tensile tester manufactured by NSK LTD. as shown in FIG. 3(a) is to be described.

The ring tensile tester comprises a fixed substrate 10 and a cylinder 11 vertically movable by an oil pressure in which the cylinder 11 moves vertically when a flat guide plate 15 disposed in contiguous with the lower portion of the cylinder 11 is guided along a vertical square cylindrical hole 10 a in the substrate 10. Semicircular jigs 12a, 12b are attached to the substrate 10 and the cylinder 11, respectively.

After attaching a ring-shaped test piece 14 to the two jigs 12a and 12b joined together into a substantially circular shape, when the cylinder 11 is moved upwardly, the jig 12b moves upward and thus the test piece 14 is pulled in the vertical direction, and the circular tensile test can be conducted.

Figure 3B:
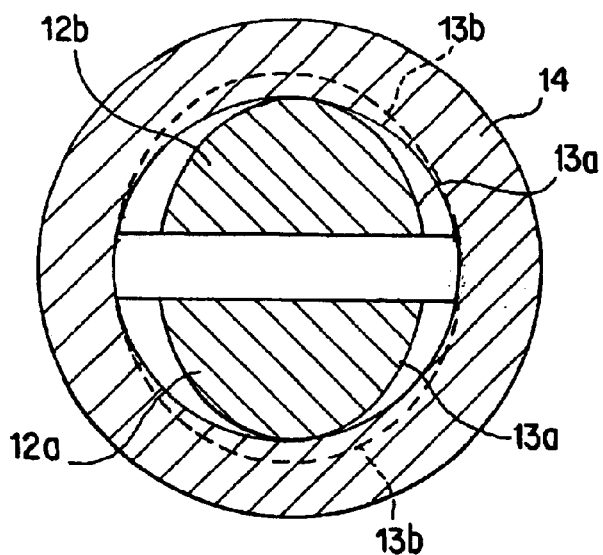
FIG. 3(b) is a cross section view of the section X–X in FIG. 3(a).

In this case, since the flat guide plate 15 moves being guided along the square cylindrical hole 10a in the substrate 10, the test piece 14 is pulled relatively in parallel with the plane perpendicular to the axial center of the test piece 14 (plane of the drawing in FIG. 3(b). Further, providing that the test piece 14 can be pulled in parallel with the plane of the test piece 14 perpendicular to the axial center of the test piece 14, the structure for guiding the flat guide plate 15 is not restricted to the structure of guiding through the square cylindrical hole 10a but, for example, it may be a structure of directly guiding the flat guide plate 15.

The diameter for the arc of the semicircular jig 12a, 12b is 0.8 times the inner diameter of the ring-shaped test piece 14 and, further, a guide groove 13 for fitting the test piece 14 is disposed to the arc portion of the jig 12a, 12b (refer to FIG. 3 (b)). The grinding groove 13 has an inside diameter 13a end an outside diameter 13b. This prevents the displacement of the mounting position of the test piece 14 and buckling of the test piece 14 in the tensile test.

Since it is considered that the bar and the flange of the pressed cage 5 have a strength identical with each other, a ring-shaped flange portion (74 mm outer diameter, 70 mm inner diameter, 2.0 mm width) obtained by cutting the bar of the pressed cage 5 (74 mm outer diameter, 70 mm inner diameter, 21.7 mm width) was used as the test piece 14. The tensile speed is 0.2 mm/sec.

The present applicant has found that such a circular tensile test is a test capable of evaluating the overall performance of the cage such as yield point to fatigue caused by circumferential stress exerting on the flange portion and the repeating stress thereof and fatigue strength of a connection part between the bar and the flange in actual pressed cages. Accordingly, the test result does not always agree with that of the tensile test for the plate-shaped test specimen as specified according to JIS or the like but this is a test suitable to the evaluation for the performance inherent to the cages.

Further, the hardness was evaluated by using a bar portion of a pocket 51 of the pressed cage 5 cut upon manufacture of the test specimen 14 for the ring tensile test. That is, the bar portion was buried and polished to measure the hardness for the inside and the hardness for the surface at a portion in contact with the roller 4. The hardness for the surface was measured for a portion from 0.02 to 0.05 mm from the surface in the direction of the depth.

The measurement for the hardness of the surface and the inside was conducted on the pressed cage 5 manufactured as described below. At first, several kinds of rolled materials having thickness identical with that of the cage of a completed product and of different draft ratios (applied with annealing after cold rolling) were provided and the hardness for the surface and the inside of the rolled materials was measured. Then, the cage was manufactured by pressing based on the result of the measurement and the hardness for the surface and the inside of the bars of completed cages thus obtained was measured.

The test results are shown in Table 2.

Figure 4:
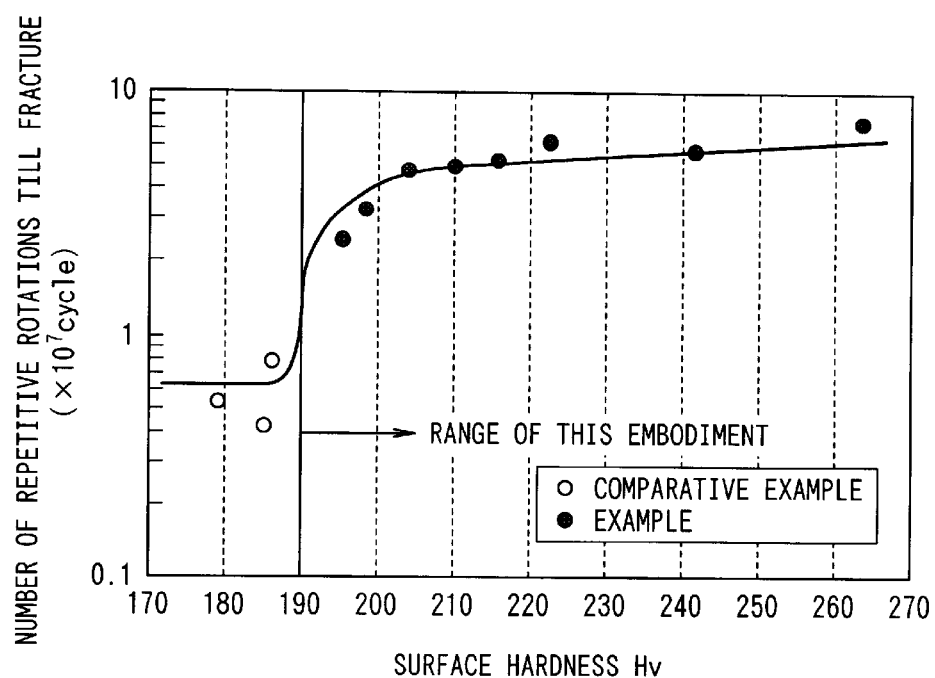
FIG. 4 is a graph showing a relation between the number of repetitive rotation leading to fracture and the hardness at a portion in contact with a rolling element of a cage for use in a rolling bearing in a rotation durability test.

At first, the effect of the hardness for the surface of the pressed cage 5 at a portion in contact with the roller 4 on the result of the rotation durability test is to be studied. The graph in FIG. 4 shows a relation between the hardness for the surface of the pressed cage 5 at a portion in contact with the roller 4 and the number of repetitive rotation till the fracture of the pressed cage 5 by the rotation durability test.

Since the rollers 4 collide repeatedly against the bars of the pockets 51 of the pressed cage 5 during rotation of the cylindrical roller bearing 1, repeated impact loads are applied to the portion of contact between the roller 4 and the bar. As in Examples 1 to 8, those having the hardness of Hv 190 or more for the surface at a portion in contact with the roller 4 show a remarkably large number of repetitive rotation till fracture.

Particularly, Examples 3 to 8 in which the hardness for the surface at a portion in contact with the roller 4 is Hv 200 or more, the number of repetitive rotation till fracture is stable at an excellent value.

However, those having the surface hardness Hv of less than 190 as in Comparative Examples 3 to 5 lack in the strength for the contact portion and, accordingly, it is considered that the rotational accuracy changes by the occurrence of minute plastic deformation by the impact load, leading to early fracture.

For Examples 1 to 8, since the hardness is Hv 190 or more by work hardening or the like and the strength at the portion in contact with the pressed cage 5 can be ensured, minute plastic deformation due to the impact load can be prevented to increase the number of repetitive rotation till the fracture.

On the other hand, in Comparative Examples 6 and 7, while the hardness at the surface for a contact portion between the roller 4 and the pressed cage 5 exceeds Hv 190, they suffer from early fracture. This is because each of the pressed cages 5 is manufactured from an extremely low carbon steel plates, the hardness for the inside, that is, the hardness of the raw material before press molding is small and the pressed cage 5 lacks in the strength. Accordingly, in order to provide the pressed cage 5 with a sufficient strength, it is necessary to ensure not only the hardness for the surface at the contact portion between the roller 4 and the pressed cage 5 but also the hardness in the inside.

Figure 5:
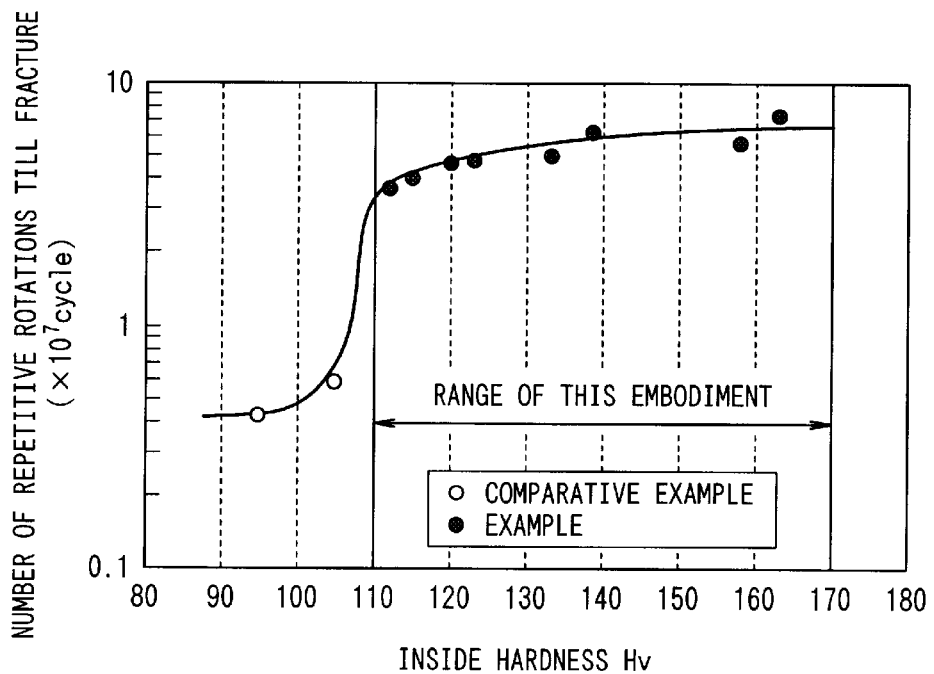
FIG. 5 is a graph showing a relation between the number of repetitive rotation leading to fracture and the hardness for the inside in a rotation durability test.

The graph in FIG. 5 shows a relation between the hardness for the inside of the pressed cage 5 and the number of repetitive rotation till the pressed cage 5 is fractured by the rotation durability test.

If the hardness for the inside is less than Hv 110, the early fracture is caused for each case in the rotation durability test but if the hardness for the inside is Hv 110 or more, the number of repetitive rotation till fracture is improved remarkably. Particularly, in Examples 3 to 8 having the hardness for the inside of Hv 120 or more, the number of repetitive rotations till fracture is stable at excellent value.

The results described above shows that while the hardness for the surface at the contact portion between the roller 4 and the pressed cage 5 can be hardened by plastic working such as area pressing, the hardness for the inside can not be hardened subsequently, so that the extremely low carbon content material excellent in the deep drawing property as in Comparative Examples 6 and 7 can not be used suitably since the hardness for the inside is low and the strength of the cage itself is poor.

Further, as shown in Examples 1 to 8, those having the hardness for the inside of Hv 110 or more, the fracture load of the cage upon tensile test is also large and the effect is self-evident.

Further, also in a case where the C content is 0.02% by weight or more and at an identical amount of carbon, since the hardness changes depending on the annealing temperature upon manufacture of the steel plate, the strength of the pressed cage 5 can be improved easily providing that the hardness for the inside is ensured by using the hard material. However, as shown in Comparative Example 2, when a hard material in excess of Hv 170 is used, the press moldability is deteriorated and a predetermined dimensional accuracy can not be obtained.

Furthermore, in Comparative Example 1, since the contents for C and Mn exceed the upper limit values for the range of the present invention and the hardness for the inside is Hv 170 or more, the press moldability of the raw material is deteriorated and a predetermined dimensional accuracy can not be obtained like that in Comparative Example 2.

As described above, the cages for use in the rolling bearing of this embodiment (Examples 1 to 8) cause less deformation or fracture and have good press moldability and dimensional accuracy.

This embodiment shows an example of the present invention and the present invention is not restricted to this embodiment. For example, while a cage for use in the cylindrical roller bearing is exemplified and explained as the cage for use in the rolling bearing, the cage for use in the rolling bearing according to the present invention is applicable also to various other kinds of rolling bearings. For example, they can include needle roller bearing, self-aligned roller bearing, deep groove ball bearing, angular ball bearing and ball bearing.

INDUSTRIAL APPLICABILITY

As has been described above, the cage for use in the rolling bearing according to the present invention is a high strength cage for use in the rolling bearing causing less deformation or fracture and having stable function.

What is claimed is:

1. A cage made of a low carbon steel for use in a rolling bearing having an outer ring, an inner ring and a plurality of rolling elements disposed rotationally between the outer ring and the inner ring, the cage comprising a plurality of pockets for retaining the rolling elements in an equi-distribution in the rotating direction of the rolling elements, wherein the low carbon steel is a steel containing from 0.02 to 0.10% by weight of C and from 0.10 to 0.45% by weight of Mn and is subjected to plastic working, the hardness for the cage surface at least at a portion in contact with the rolling element is Hv 190 to 270, and the hardness for a core portion of the cage is Hv 110 to 170.

2. A cage for use in a rolling bearing as defined in claim 1, wherein the hardness for the cage surface at least at the portion in contact with the rolling element is Hv 200 to 270 and the hardness for the core portion of the cage is Hv 120 to 170.

3. A cage for use in a rolling bearing as defined in claim 1 or 2, wherein the ratio between the yield strength and the tensile strength (yield strength/tensile strength) of the low carbon steel is from 0.65 to 0.75.

4. A cage for use in a rolling bearing as defined in claim 1 or 2, wherein the ratio between the yield strength and the tensile strength (yield strength/tensile strength) of the low carbon steel is from 0.70 to 0.75.

* * * * *

UNITED STATES PATENT AND TRADEMARK OFFICE
CERTIFICATE OF CORRECTION

PATENT NO.     : 6,712,520 B2
DATED          : March 30, 2004
INVENTOR(S)    : Koji Ueda et al.

It is certified that error appears in the above-identified patent and that said Letters Patent is hereby corrected as shown below:

<u>Title page,</u>
Item [22], PCT Filed, change "February 26, 2001" to -- January 26, 2001 --.

Signed and Sealed this

Seventeenth Day of August, 2004

JON W. DUDAS
*Acting Director of the United States Patent and Trademark Office*